United States Patent
Chang et al.

(10) Patent No.: US 9,701,517 B2
(45) Date of Patent: Jul. 11, 2017

(54) METHODS AND APPARATUSES FOR APPLYING A SUBSTRATE ONTO AN ELEVATOR SHEAVE

(75) Inventors: Xiaoyuan Chang, Ellington, CT (US); David R. Torlai, Torrington, CT (US); Peter Keyo, Canton, CT (US); Lance L. Lavender, Enfield, CT (US); Hong Yang, Avon, CT (US)

(73) Assignee: Otis Elevator Company, Farmington, CT (US)

( * ) Notice: Subject to any disclaimer, the term of this patent is extended or adjusted under 35 U.S.C. 154(b) by 429 days.

(21) Appl. No.: 14/395,992

(22) PCT Filed: May 4, 2012

(86) PCT No.: PCT/US2012/036580
§ 371 (c)(1),
(2), (4) Date: Mar. 12, 2015

(87) PCT Pub. No.: WO2013/165438
PCT Pub. Date: Nov. 7, 2013

(65) Prior Publication Data
US 2015/0210510 A1    Jul. 30, 2015

(51) Int. Cl.
| | |
|---|---|
| *F16H 55/38* | (2006.01) |
| *B66B 11/08* | (2006.01) |
| *B66B 15/02* | (2006.01) |
| *B32B 37/12* | (2006.01) |
| *B32B 37/14* | (2006.01) |

(Continued)

(52) U.S. Cl.
CPC ............. *B66B 15/02* (2013.01); *B32B 37/12* (2013.01); *B32B 37/142* (2013.01); *B32B 37/18* (2013.01); *B32B 38/10* (2013.01); *B32B 2307/538* (2013.01); *B32B 2475/00* (2013.01); *B66B 11/008* (2013.01); *D07B 2501/2007* (2013.01); *F16H 55/38* (2013.01); *Y10T 156/17* (2015.01)

(58) Field of Classification Search
CPC ....... F16H 55/38; B66B 15/04; B66B 11/008; D07B 2501/2007; F16D 69/00; B32B 37/10; B32B 37/12; B32B 2307/538; B32B 2475/00; B29C 53/56; B29C 53/562

See application file for complete search history.

(56) References Cited

U.S. PATENT DOCUMENTS

| | | | |
|---|---|---|---|
| 3,809,442 A | 5/1974 | Peterson et al. | |
| 4,034,616 A | 7/1977 | Rauscher | |

(Continued)

FOREIGN PATENT DOCUMENTS

| | | |
|---|---|---|
| CA | 1243295 | 10/1988 |
| EP | 1902994 | 3/2008 |

(Continued)

OTHER PUBLICATIONS

Office action for JP2015-510239 dated Jan. 5, 2016.

*Primary Examiner* — Carson Gross
(74) *Attorney, Agent, or Firm* — O'Shea Getz P.C.

(57) ABSTRACT

An elevator maintenance kit is provided for surfacing an elevator sheave that engages with an elevator tension member. The kit includes a substrate with an adhesive backing, and a substrate applicator that is operable to apply the substrate to the sheave as the sheave is rotated. The adhesive backing is operable to attach the substrate to the sheave during the sheave rotation.

8 Claims, 8 Drawing Sheets

(51) Int. Cl.
*B32B 37/18* (2006.01)
*B32B 38/10* (2006.01)
*B66B 11/00* (2006.01)

(56) References Cited

U.S. PATENT DOCUMENTS

| | | | |
|---|---|---|---|
| 4,410,120 A | 10/1983 | Henk | |
| 5,551,917 A | 9/1996 | Wood | |
| 5,723,388 A | 3/1998 | Kobayashi et al. | |
| 5,740,887 A | 4/1998 | Unger et al. | |
| 5,792,294 A * | 8/1998 | Randazzo | B29C 65/00 156/158 |
| 6,193,016 B1 | 2/2001 | Hollowell et al. | |
| 6,273,244 B1 | 8/2001 | Dingeldein et al. | |
| 6,626,283 B2 | 9/2003 | McBride | |
| 6,655,500 B2 | 12/2003 | Orrman et al. | |
| 6,805,222 B2 | 10/2004 | St. Pierre et al. | |
| 7,364,019 B2 | 4/2008 | Faletto | |
| 7,377,366 B2 | 5/2008 | Det et al. | |
| 7,661,514 B2 | 2/2010 | Ach | |
| 7,748,501 B2 | 7/2010 | Marler et al. | |
| 7,777,986 B2 | 8/2010 | Barkley et al. | |
| 7,971,687 B2 | 7/2011 | Alves et al. | |
| 2002/0000346 A1* | 1/2002 | Baranda | B66B 7/06 187/254 |
| 2002/0017537 A1 | 2/2002 | Barklin et al. | |
| 2004/0154849 A1 | 8/2004 | Fodor | |
| 2006/0070822 A1 | 4/2006 | Osada et al. | |
| 2006/0254887 A1 | 11/2006 | Aubry et al. | |
| 2008/0053796 A1 | 3/2008 | DePaso et al. | |
| 2008/0087500 A1 | 4/2008 | Ach et al. | |
| 2008/0223665 A1* | 9/2008 | O'Donnell | B66B 7/062 187/256 |
| 2010/0133046 A1 | 6/2010 | Allwardt et al. | |
| 2010/0140022 A1 | 6/2010 | Ach | |
| 2010/0243374 A1 | 9/2010 | Boren et al. | |
| 2010/0249831 A1 | 9/2010 | Vlasblom et al. | |
| 2010/0286728 A1 | 11/2010 | Simmelink et al. | |
| 2010/0298079 A1 | 11/2010 | Shirike et al. | |
| 2011/0088978 A1 | 4/2011 | Tremblay et al. | |
| 2011/0114908 A1 | 5/2011 | Fargo et al. | |
| 2011/0259676 A1 | 10/2011 | Nardi et al. | |
| 2011/0259677 A1 | 10/2011 | Dudde et al. | |
| 2012/0318615 A1 | 12/2012 | Aulanko et al. | |

FOREIGN PATENT DOCUMENTS

| | | |
|---|---|---|
| GB | 2292362 | 2/1996 |
| JP | 60197752 | 10/1985 |
| JP | 61178767 | 11/1986 |
| JP | H632521 | 2/1994 |
| WO | 2011148033 | 12/2011 |

* cited by examiner

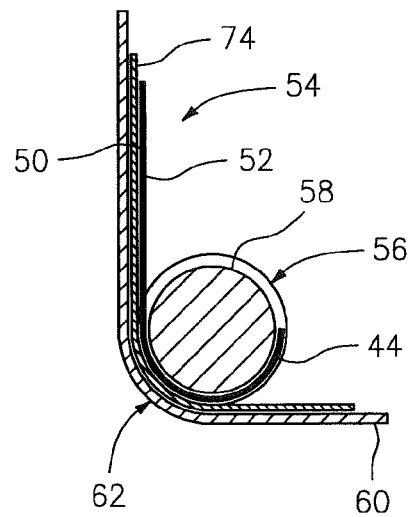 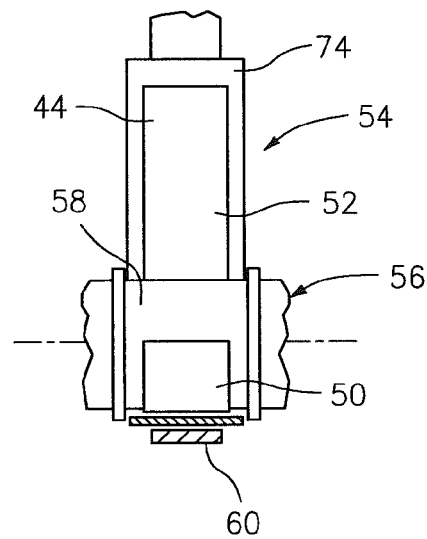
FIG. 5    FIG. 6
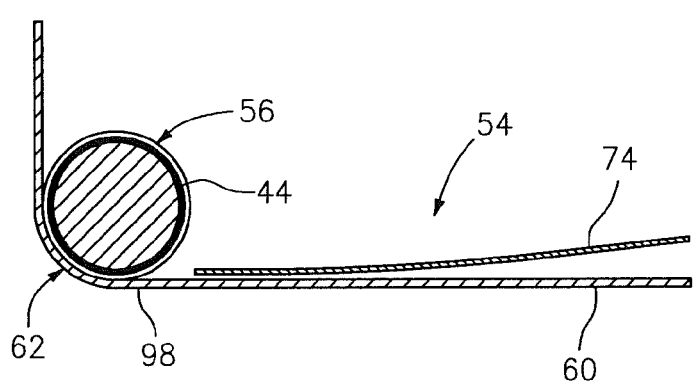 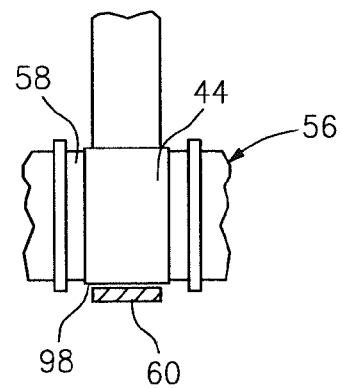
FIG. 7    FIG. 8

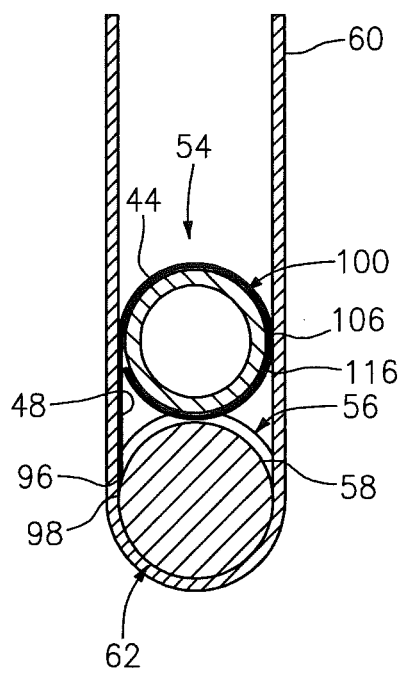 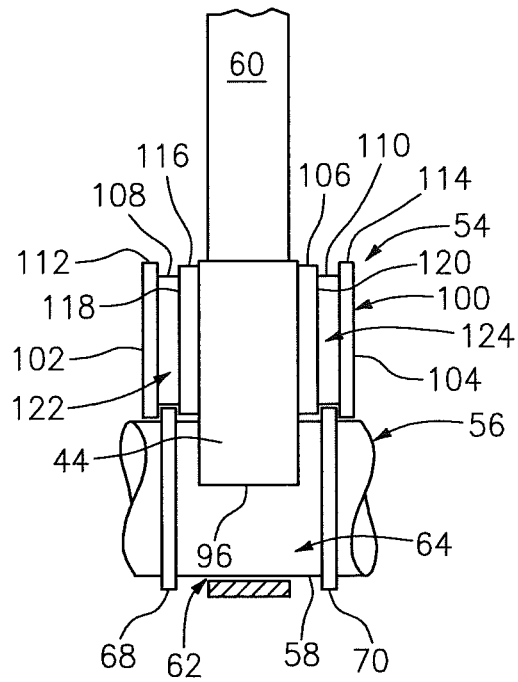
*FIG. 10*  *FIG. 11*
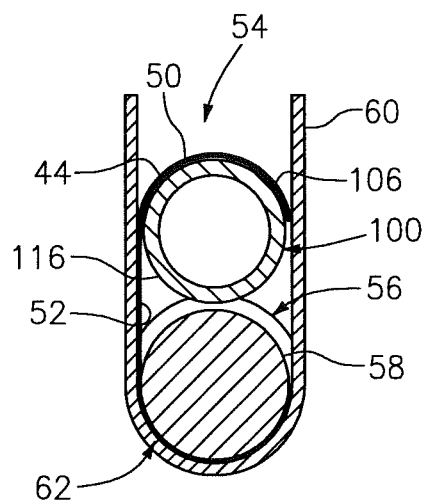 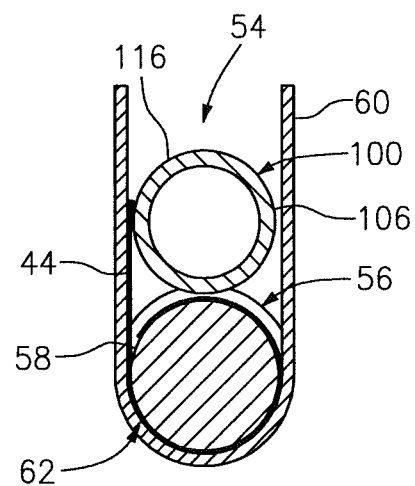
*FIG. 12*  *FIG. 13*

METHODS AND APPARATUSES FOR APPLYING A SUBSTRATE ONTO AN ELEVATOR SHEAVE

BACKGROUND OF THE INVENTION

1. Technical Field

This application is entitled to the benefit of, and incorporates by reference essential subject matter disclosed in PCT Application No. PCT/US2012/036580 filed on May 4, 2012.

This disclosure relates generally to elevators and, more particularly, to methods and apparatuses for applying a substrate onto an elevator sheave.

2. Background Information

A typical traction elevator car drive system includes a plurality of tension members that serpentine around a plurality of sheaves (also referred to as "pulleys"), and connect a motor to an elevator car and a counterweight. During operation, the motor moves the tension members about the sheaves to lift or lower the elevator car within an elevator hoistway.

Under certain conditions, one or more of the tension members may slip against one or more of the sheaves. Buildup of relatively high shear forces between the tension members and the sheaves, for example, may cause one of the tension members to momentarily lose traction with one of the sheaves. The loss and subsequent re-establishment of traction may induce vibrations in the tension members that can produce airborne noise within the hoistway and/or structural borne noise within the drive system. One approach for reducing such noise is to condition the tension members with a conditioning agent such as, for example, wax. Such an approach, however, can be time consuming and typically must be frequently repeated.

SUMMARY OF THE DISCLOSURE

According to an aspect of the invention, an elevator maintenance kit is provided for surfacing an elevator sheave that engages with an elevator tension member. The kit includes a substrate with an adhesive backing, and a substrate applicator that is operable to apply the substrate to the sheave as the sheave is rotated. The adhesive backing is operable to attach the substrate to the sheave during the sheave rotation.

Alternatively or in addition to this or other aspects of the invention, the substrate also includes a polymer film that is operable to be attached to the sheave with the adhesive backing. In some embodiments, the polymer film comprises ultra high molecular weight polyethylene.

Alternatively or in addition to this or other aspects of the invention, the substrate applicator comprises a flexible substrate carrier sheet to which the substrate is attached. The carrier sheet is operable to move with the substrate through the sheave-member interface and compress the substrate against the sheave as the sheave is rotated.

Alternatively or in addition to this or other aspects of the invention, the substrate is removably attached to the carrier sheet with an adhesive.

Alternatively or in addition to this or other aspects of the invention, the maintenance kit also includes an adhesive that is operable to removably attach the carrier sheet to the tension member.

Alternatively or in addition to this or other aspects of the invention, the substrate has a substrate width and a substrate length, and the carrier sheet has a sheet width and a sheet length. The sheet width is greater than or equal to the substrate width, and the sheet length is greater than or equal to the substrate length.

Alternatively or in addition to this or other aspects of the invention, the substrate applicator includes a cylindrical applicator body around which the substrate is wrapped. The applicator body is operable to rotate about an axis thereof and feed the substrate into the sheave-member interface as the sheave rotates.

Alternatively or in addition to this or other aspects of the invention, the applicator body includes one or more annular alignment grooves. Each of the one or more alignment grooves is operable to mate with a respective annular flange of the sheave.

Alternatively or in addition to this or other aspects of the invention, the applicator body extends between first and second alignment flanges. The alignment flanges are operable to be arranged within a tension member engagement groove of the sheave. The substrate is arranged between the alignment flanges.

Alternatively or in addition to this or other aspects of the invention, the maintenance kit also includes an applicator base to which the applicator body is rotatably connected and supported.

Alternatively or in addition to this or other aspects of the invention, the maintenance kit also includes a second substrate including a second adhesive backing. The second substrate is wrapped around the applicator body. The applicator is further operable to apply the second substrate to the sheave as the sheave is rotated about the axis thereof. The second adhesive backing is operable to attach the second substrate to the sheave as the second substrate moves through a circumferentially extending second sheave-member interface between the sheave and a second elevator tension member during the sheave rotation.

According to another aspect of the invention, a method is provided for applying a substrate onto an elevator sheave that engages with an elevator tension member. The method includes steps of: (a) positioning a substrate applicator adjacent to the sheave, wherein the substrate is engaged with the applicator and includes an adhesive backing; (b) disposing an end of the substrate between the sheave and the tension member at a first end of the sheave-member interface; and (c) applying the substrate to the sheave by rotating the sheave, and by attaching the substrate to the sheave with the adhesive backing during the rotation of the sheave.

Alternatively or in addition to this or other aspects of the invention, the sheave has a sheave circumference, the tension member has a member width, and the substrate has a substrate length and a substrate width. The substrate length is greater than or equal to the sheave circumference, and the substrate width is greater than or equal to the member width.

Alternatively or in addition to this or other aspects of the invention, the applicator comprises a flexible substrate carrier sheet to which the substrate is attached. The step of disposing comprises disposing the carrier sheet and the end of the substrate between the sheave and the tension member, wherein the carrier sheet is arranged between the substrate and the tension member. The step of applying further comprises removing the carrier sheet from a portion of the substrate that extends out of a second end of the sheave-member interface.

Alternatively or in addition to this or other aspects of the invention, the method also includes steps of: removably attaching the carrier sheet to the tension member proximate to the first end of the sheave-member interface with an adhesive; and removing the carrier sheet from the tension member proximate to the second end of the sheave-member interface.

Alternatively or in addition to this or other aspects of the invention, the applicator includes a cylindrical applicator body around which the substrate is wrapped. The step of applying includes feeding the substrate from the applicator body into the sheave-member interface by rotating the applicator body about an axis thereof during the sheave rotation.

Alternatively or in addition to this or other aspects of the invention, the tension member is arranged in a groove of the sheave, and the groove extends between first and second annular sheave flanges. The applicator body includes one or more annular alignment grooves. The step of positioning includes mating each of the one or more alignment grooves with a respective one of the sheave flanges.

Alternatively or in addition to this or other aspects of the invention, the tension member is arranged in a groove of the sheave, and the groove extends between first and second annular sheave flanges. The applicator body extends axially between a pair of annular alignment flanges. The step of positioning includes positioning the alignment flanges within the groove between the sheave flanges.

Alternatively or in addition to this or other aspects of the invention, a second substrate is engaged with the applicator and includes a second adhesive backing. The step of disposing includes disposing an end of the second substrate between the sheave and a second tension member at a first end of a circumferentially extending second sheave-member interface between the sheave and the second tension member. The step of applying includes: applying the second substrate to the sheave by rotating the sheave about the axis thereof; and attaching the second substrate to the sheave with the second adhesive backing as the second substrate moves through the second sheave-member interface during the rotation of the sheave.

The foregoing features and the operation of the invention will become more apparent in light of the following description and the accompanying drawings.

BRIEF DESCRIPTION OF THE DRAWINGS

FIG. 5 is another diagrammatic side-sectional illustration of the substrate applicator of FIG. 3.

FIG. 6 is another diagrammatic front view illustration of the substrate applicator of FIG. 3.

FIG. 7 is still another diagrammatic side-sectional illustration of the substrate applicator of FIG. 3.

FIG. 8 is still another diagrammatic front view illustration of the substrate applicator of FIG. 3.

FIG. 10 is a diagrammatic side-sectional illustration of another substrate applicator for applying a substrate onto an elevator sheave engaged with an elevator tension member.

FIG. 11 is a partial diagrammatic front view illustration of the substrate applicator of FIG. 10.

FIG. 12 is another diagrammatic side-sectional illustration of the substrate applicator of FIG. 10.

FIG. 13 is still another diagrammatic side-sectional illustration of the substrate applicator of FIG. 10.

DETAILED DESCRIPTION OF THE INVENTION

Figure 1:
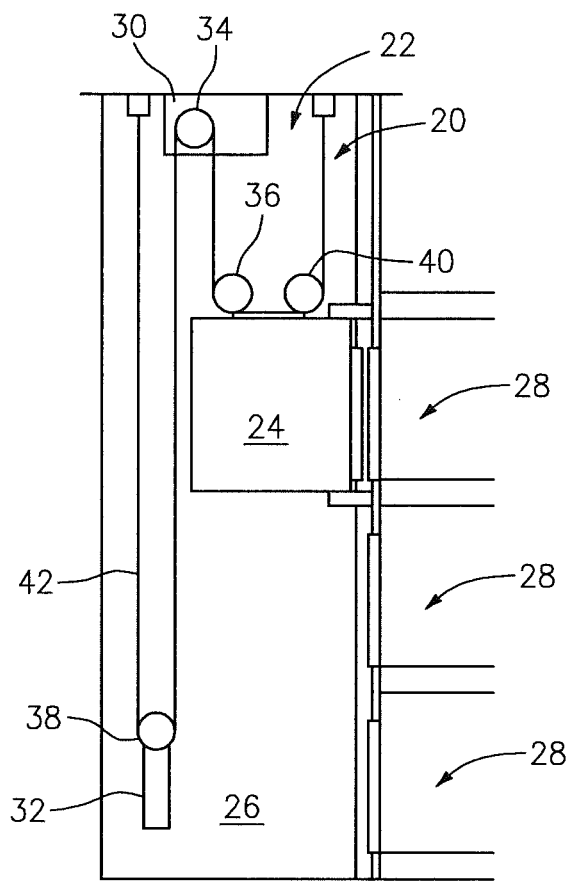
FIG. 1 is a diagrammatic illustration of an elevator system arranged in a building hoistway.

FIG. 1 illustrates an (e.g., traction) elevator system 20 arranged in a building hoistway 26. The elevator system 20 includes an elevator car drive system 22 that moves an elevator car 24 vertically within the hoistway 26 between, for example, a plurality of elevator landings 28.

The drive system 22 includes a motor 30. The elevator system 20 also includes a counterweight 32, a plurality of elevator sheaves 34, 36, 38 and 40, and one or more (e.g., anchored) elevator tension members 42 (e.g., ropes, belts, etc.). The elevator system 20 includes one or more sheaves. A first of the sheaves 34 (e.g., a drive sheave) is rotatably connected to the motor 30. The elevator system 20 could include one or more sheaves 38 (e.g., an idler sheave) rotatably connected to the counterweight 32. The elevator system 20 could include one or more sheaves 36 and 40 (e.g., idler and/or diverter sheaves) rotatably connected to the elevator car 24. The tension members 42 are engaged with (e.g., serpentined around) the elevator sheaves, and connect the motor 30 to the elevator car 24 and the counterweight 32. The present invention, however, is not limited to any particular drive system components and/or configurations.

During elevator system operation, the motor 30 selectively rotates the first sheave 34 to move the tension members 42 about the sheaves 36, 38 and 40. The movement of the tension members 42, in turn, causes the elevator car 24 and the counterweight 32 to respectively move (e.g., lift or lower) vertically within the hoistway 26.

Under certain conditions, one or more of the tension members 42 may momentarily or periodically slip against one or more of the sheaves (e.g., the sheaves 36, 38 and 40) during tension member movement. Buildup of relatively high shear forces between the tension members and the sheaves, for example, may cause a respective one of the tension members to momentarily lose traction with a respective one of the sheaves. The loss and subsequent re-establishment of traction may induce vibrations in the tension members that can produce airborne noise within the hoistway 26 and/or structural borne noise within the drive system 22.

Figure 2:
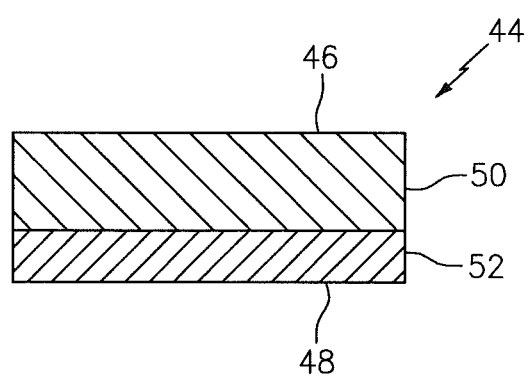
FIG. 2 is a diagrammatic cross-sectional illustration of a substrate for reducing and/or preventing noise between an elevator sheave and an elevator tension member.

FIG. 2 illustrates a substrate 44 (e.g., tape) that is configured to reduce and/or prevent the noise induced by slippage between one or more of the tension members 42 and one or more of the sheaves (e.g., the sheaves 36, 38 and 40). The substrate 44, for example, may enable localized surface slippage (e.g., reduce friction) between one of the tension members and a respective one of the sheaves. Enabling localized surface slippage reduces a magnitude of shear forces that can buildup between the tension member and the sheave, which may reduce noise generating vibrations.

The substrate 44 extends between an exterior substrate surface 46 and an interior substrate surface 48. The substrate 44 can include a noise reduction, low friction polymer film 50 and an adhesive backing 52. The polymer film 50 extends from the exterior substrate surface 46 to the adhesive backing 52. The adhesive backing 52 extends from the polymer film 50 to the interior substrate surface 48.

The polymer film 50 may be constructed from, for example, a polyethylene (PE) polymer such as ultra high molecular weight (UHMW) polyethylene. In another example, the polymer film 50 may be constructed from a fluoropolymer such as polytetrafluoroethylene (PTFE). It is worth noting, however, that UHMW polyethylene may have improved wear characteristics as compared to other polymers such as PTFE; e.g., UHMW polyethylene exhibits a relatively low material transfer rate. Utilizing UHMW polyethylene therefore can reduce film material transfer onto the tension members, which thereby can reduce the potential for material transfer induced slippage between the tension members and the first sheave 34 (e.g., the drive sheave). The present invention, however, is not limited to any particular film materials.

The adhesive backing 52 may be constructed from, for example, an acrylic adhesive that is resistant to severe environmental conditions (e.g., fluctuations between high and low temperatures) as well as aging. The present invention, however, is not limited to any particular adhesive materials.

An example of a substrate tape with an UHMW polyethylene film and an acrylic adhesive backing is Squeak Reduction Tape 5430, which is manufactured by 3M™ Corporation of St. Paul, Minn. Another example of a substrate tape is a PTFE tape with a plurality of indentations and/or projections arranged thereon. The indentations and/or projections can be adapted to further reduce shear force buildup between the tension member(s) and the sheave(s). Examples of indentation/projection shapes include, but are not limited to, circles, ovals, triangles, rectangles, hexagons, trapezoids, straight lines and/or wavy lines. Such indentations and/or projections can also be included on substrates constructed from various other types of materials such as, for example, UHMW polyethylene, etc.

FIGS. 3-8 illustrate an embodiment of a substrate applicator 54 for applying the substrate 44 onto a sheave 56 (e.g., the sheave 36 in FIG. 1) and, in particular, onto a tension member contact surface 58. Briefly, referring to FIGS. 3 and 4, the contact surface 58 is engaged with a tension member 60 (e.g., the tension member 42 in FIG. 1) along a circumferentially extending sheave-member interface 62. The contact surface 58 is configured within an annular tension member groove 64. The contact surface 58 has a surface width 66 that extends axially between an annular first flange 68 and an annular second flange 70. The contact surface 58 also has a surface circumference that extends circumferentially around the sheave 56, which is equal to or less than a length 72 of the substrate 44.

Figure 4:
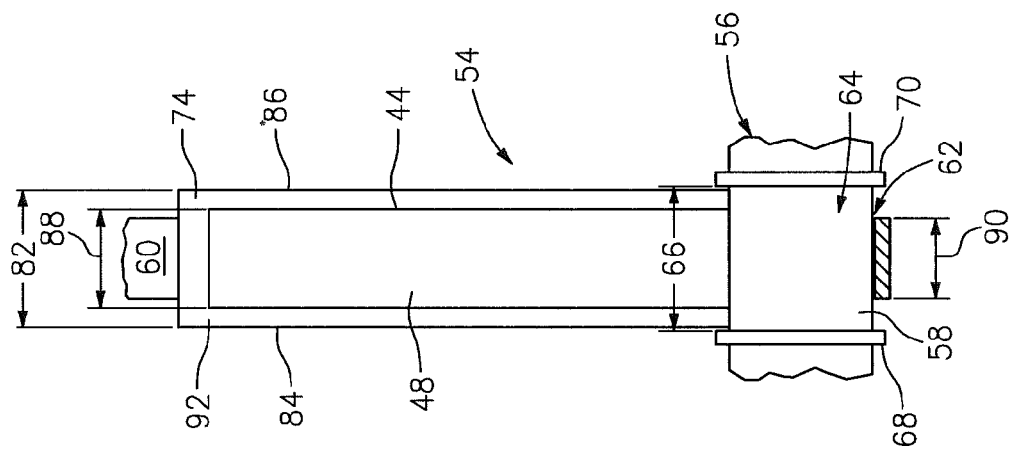
FIG. 4 is a diagrammatic front view illustration of the substrate applicator of FIG. 3.
Figure 3:
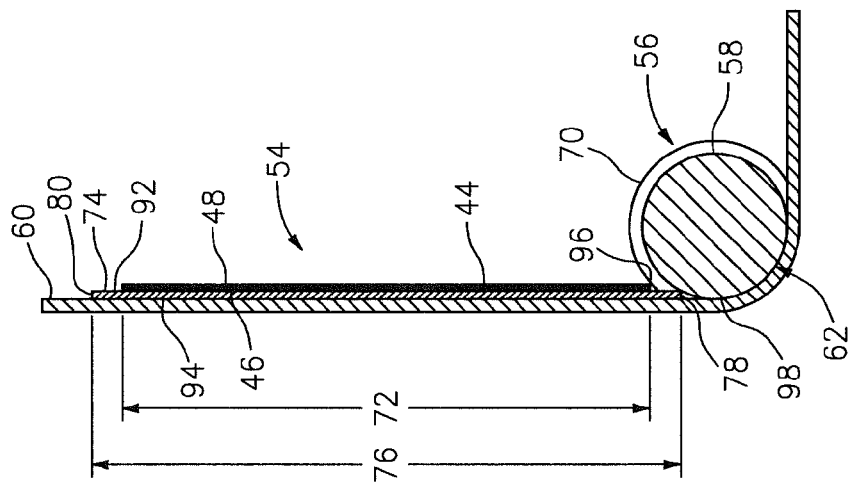
FIG. 3 is a diagrammatic side-sectional illustration of a substrate applicator for applying a substrate onto an elevator sheave engaged with an elevator tension member.

In the embodiment in FIGS. 3 and 4, the substrate applicator 54 is configured as a flexible substrate carrier sheet 74 to which the exterior substrate surface 46 may be removably attached. The carrier sheet 74 has a sheet length 76 that extends longitudinally between a first sheet end 78 and a second sheet end 80, which length 76 is equal to or greater than the substrate length 72. The carrier sheet 74 has a sheet width 82 that extends laterally (e.g., axially) between a first sheet side 84 and a second sheet side 86. The sheet width 82 is equal to or less than the surface width 66, and equal to or greater than a width 88 of the substrate 44. The substrate width 88 is equal to or greater than a width 90 of the tension member 60. The carrier sheet 74 also has a sheet thickness that extends between an interior sheet surface 92 and an exterior sheet surface 94.

The carrier sheet 74 is constructed from a flexible material that has a material stiffness greater than that of the substrate 44. Examples of such a flexible material include, but are not limited to, sheet plastic, sheet metal, etc. Generally, the sheet thickness is greater than that of the substrate 44 to further increase its relative stiffness.

Figure 9:
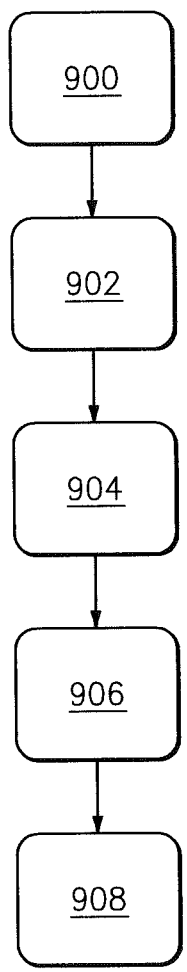
FIG. 9 is a flow diagram of a method for applying a substrate onto a contact surface of a sheave utilizing the substrate applicator of FIG. 3.

FIG. 9 is a flow diagram of a method for applying the substrate 44 onto the contact surface 58 utilizing the carrier sheet 74. Referring to FIGS. 3, 4 and 9, in step 900, the exterior substrate surface 46 is removably attached to the interior sheet surface 92 with a light adhesive. The exterior substrate surface 46 can be removably attached to the interior sheet surface 92 with, for example, double sided tape (or folded tape) having a relatively low tackiness. In step 902, the carrier sheet 74 is positioned adjacent to the sheave 56. The exterior sheet surface 94, for example, is removably attached to the tension member 60 with a light adhesive adjacent to the sheave 56.

In step 904, the first sheet end 78 and a respective end 96 of the substrate 44 are disposed between the sheave 56 and the tension member 60 at a first end 98 of the sheave-member interface 62. This step can be performed, for example, by positioning the carrier sheet 74 and the substrate 44 in the aforesaid location during step 902. Alternatively, this step can be performed by moving the tension member 60 and rotating the sheave 56 about its axis in, for example, a counter-clockwise direction.

Referring to FIGS. 5-9, in step 906, the substrate 44 is applied to the contact surface 58 by moving the tension member 60 and rotating the sheave 56 in, for example, the counter-clockwise direction. The adhesive backing 52, for example, attaches the polymer film 50 to the contact surface 58 as the substrate 44 moves through and is compressed by the carrier sheet 74 in the sheave-member interface 62. The sheave 56 may be rotated one or more rotations, depending on the substrate length, to fully apply the substrate 44 to the sheave 56.

Referring to FIGS. 7 and 9, in step 908, the carrier sheet 74 is removed (e.g., peeled away) from the tension member 60 or the substrate 44 proximate a second end 98 of the sheave-member interface 62. The carrier sheet 74, for example, can be peeled away from the tension member 60 where the carrier sheet 74 remains attached to the tension member 60 after the substrate 44 is applied to the contact surface 58. Alternatively, the carrier sheet 74 can be peeled away from the substrate 44 where the carrier sheet 74 remains attached to the substrate 44 after the substrate 44 application to the contact surface 58 (not shown).

FIGS. 10-13 illustrate another embodiment of the substrate applicator 54 for applying the substrate 44 onto a sheave 56 (e.g., the sheave 40 in FIG. 1). In the embodiment in FIGS. 10 and 11, the substrate applicator 54 includes a cylindrical (e.g., tubular) applicator body 100 around which the substrate 44 may be wrapped.

The applicator body 100 extends axially between a first body end 102 and a second body end 104. The applicator body 100 includes a base segment 106, one or more bridge segments 108 and 110, and one or more annular alignment flanges 112 and 114. The base segment 106 has an outer radial substrate contact surface 116 that extends axially between a first base end 118 and a second base end 120. A first of the bridge segments 108 extends axially between the first base end 118 and a first of the alignment flanges 112, thereby forming an outer radial annular first alignment groove 122 therebetween. A second of the bridge segments 110 extends axially between the second base end 120 and a second of the alignment flanges 114, thereby forming an outer radial annular second alignment groove 124 therebetween. The first alignment flange 112 is arranged adjacent to the first body end 102. The second alignment flange 114 is arranged adjacent to the second body end 104.

Figure 14:
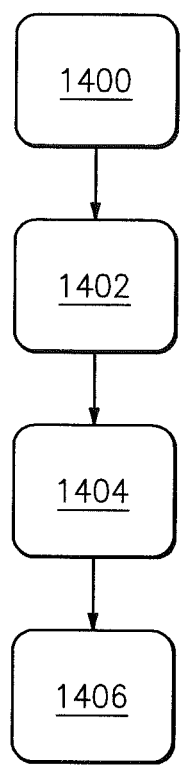
FIG. 14 is a flow diagram of a method for applying a substrate onto a contact surface of a sheave utilizing the substrate applicator of FIG. 10.

FIG. 14 is a flow diagram of a method for applying the substrate 44 onto the contact surface 58 utilizing the applicator body 100. Referring to FIGS. 10, 11 and 14, in step 1400, the substrate 44 is wrapped around the base segment 106 such that, for example, the interior substrate surface 48 is facing the substrate contact surface 116.

In step 1402, the applicator body 100 is positioned adjacent to the sheave 56. The applicator body 100, for example, can be disposed between opposing portions of the tension member 60, and each of the alignment grooves 122 and 124 is mated with a respective one of the sheave flanges 68 and 70.

In step 1404, an end 96 of the substrate 44 is disposed between the sheave 56 and the tension member 60 at the first end 98 of the sheave-member interface 62. A portion of the substrate 44, for example, can be unwrapped from the applicator body 100 and placed into position.

Referring to FIGS. 12-14, in step 1406, the substrate 44 is applied to the contact surface 58 by moving the tension member 60 and rotating the sheave 56 in, for example, the counter-clockwise direction. The adhesive backing 52, for example, attaches the polymer film 50 to the contact surface 58 as the substrate 44 moves through and is compressed by the tension member 60 in the sheave-member interface 62. The applicator body 100 rotates concurrently with the sheave 56, thereby feeding the substrate 44 into the sheave-member interface 62 for attachment onto the sheave 56. The sheave 56 may be rotated one or more rotations, depending on the substrate length, to fully apply the substrate 44 to the sheave 56. In some embodiments, a portion of the substrate 44 extending between the applicator body 100 and the sheave 56 may be cut where, for example, the substrate 44 has not already been pre-apportioned into fixed lengths.

Figure 15:
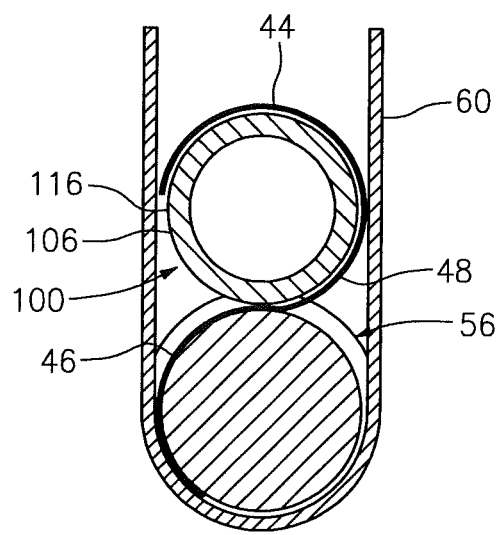
FIG. 15 is a diagrammatic side-sectional illustration of still another substrate applicator for applying a substrate onto an elevator sheave engaged with an elevator tension member.

In an alternative embodiment, for example as illustrated in FIG. 15, the substrate 44 can be wrapped around the base segment 106 such that, for example, the exterior substrate surface 46 is facing the substrate contact surface 116. In such an embodiment, the substrate 44 may cross between the applicator body 100 and the sheave 56.

Figure 16:
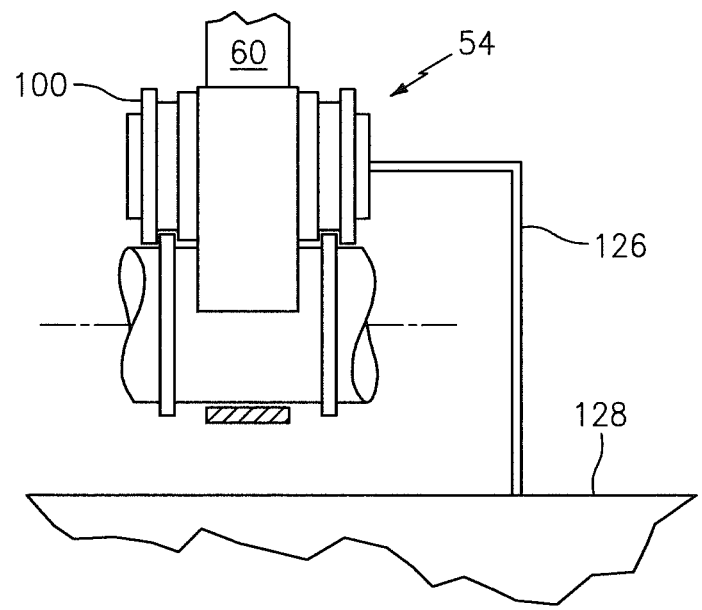
FIG. 16 is a diagrammatic front view illustration of still another substrate applicator for applying a substrate onto an elevator sheave engaged with an elevator tension member.

In some embodiments, for example as illustrated in FIG. 16, the applicator body 100 can be rotatably connected to and support by an applicator base 126. The applicator base 126 can be configured to be held by a technician during the application process, or alternatively mounted to a component 128 (e.g., the elevator car 24, the counterweight 32, etc.) of the elevator system.

Figure 17:
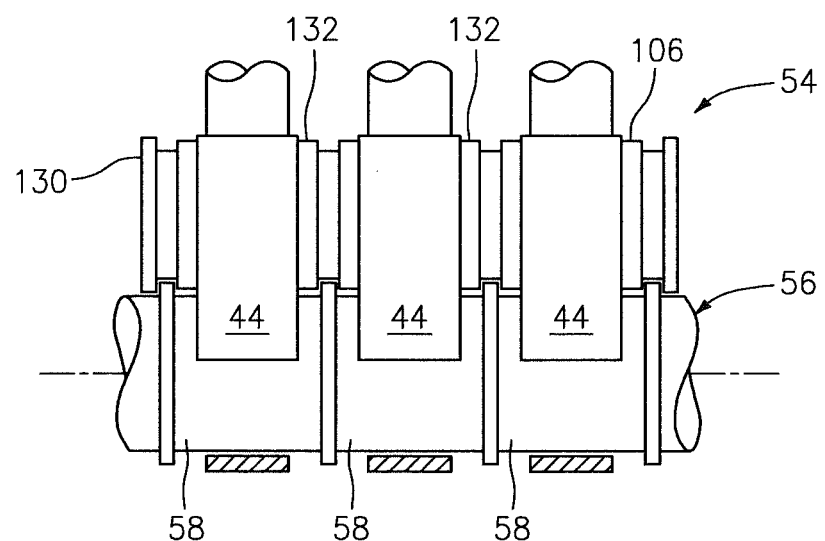
FIG. 17 is a diagrammatic front view illustration of a substrate applicator for applying a plurality of substrates onto an elevator sheave engaged with a plurality of elevator tension members.

FIG. 17 illustrates an alternate embodiment of a cylindrical applicator body 130. In contrast to the applicator body 100 in FIG. 11, the applicator body 130 includes one or more additional base segments 132. The additional base segments 132 can be utilized during operation, in a fashion as described above, to concurrently apply a plurality of the substrates 44 to respective tension member contact surfaces 58. In some embodiments, the applicator body 130 can be configured as a single body as shown in FIG. 17. In alternative embodiments, the applicator body 130 can be configured as a plurality of modular sections.

Figure 18:
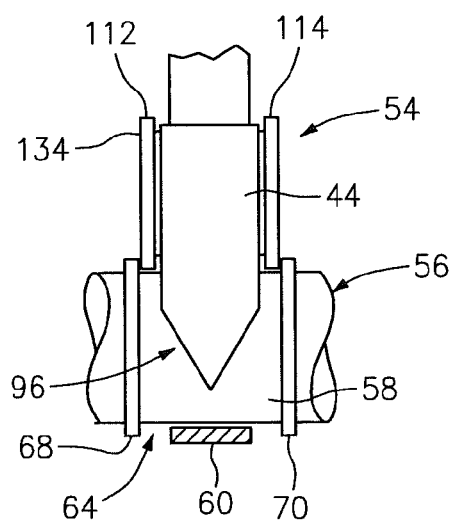
FIG. 18 is a diagrammatic front view illustration of still another substrate applicator for applying a substrate onto an elevator sheave engaged with an elevator tension member.

FIG. 18 illustrates another alternate embodiment of a cylindrical applicator body 134. In contrast to the applicator body 100 in FIG. 11, the applicator body 134 is configured without the alignment grooves 122 and 124 (see FIG. 11). In addition, the applicator body 134 is sized such that the alignment flanges 112 and 114 may be positioned within the tension member groove 64 between the sheave flanges 68 and 70.

In some embodiments, for example as illustrated in FIG. 18, one or more ends 96 of the substrate 44 may be tapered to prevent formation of abrupt ridges on the sheave 56 after the substrate 44 is applied to the contact face 58.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A method for applying a substrate onto an elevator sheave that engages with an elevator tension member, the method comprising:
    positioning a substrate applicator adjacent to the sheave, wherein the substrate is engaged with the applicator and includes an adhesive backing;
    disposing an end of the substrate between the sheave and the tension member at a first end of a sheave-member interface; and
    applying the substrate to the sheave by rotating the sheave, and by attaching the substrate to the sheave with the adhesive backing during the rotation of the sheave.

2. The method of claim 1, wherein
    the sheave has a sheave circumference, the tension member has a member width, and the substrate has a substrate length and a substrate width; and
    the substrate length is one of greater than and equal to the sheave circumference, and the substrate width is one of greater than and equal to the member width.

3. The method of claim 1, wherein
    the applicator comprises a flexible substrate carrier sheet to which the substrate is attached;
    the disposing comprises disposing the carrier sheet and the end of the substrate between the sheave and the tension member, wherein the carrier sheet is arranged between the substrate and the tension member; and
    the applying further comprises removing the carrier sheet from a portion of the substrate that extends out of a second end of the sheave-member interface.

4. The method of claim 3, further comprising:
removably attaching the carrier sheet to the tension member proximate to the first end of the sheave-member interface with an adhesive; and
removing the carrier sheet from the tension member proximate to the second end of the sheave-member interface.

5. The method of claim 1, wherein
the applicator comprises a cylindrical applicator body around which the substrate is wrapped; and
the applying further comprises feeding the substrate from the applicator body into the sheave-member interface by rotating the applicator body about an axis thereof during the sheave rotation.

6. The method of claim 5, wherein
the tension member is arranged in a groove of the sheave, and the groove extends between first and second annular sheave flanges;
the applicator body includes one or more annular alignment grooves; and
the positioning further comprises mating each of the one or more alignment grooves with a respective one of the sheave flanges.

7. The method of claim 5, wherein
the tension member is arranged in a groove of the sheave, and the groove extends between first and second annular sheave flanges;
the applicator body extends axially between a pair of annular alignment flanges; and
the positioning further comprises positioning the alignment flanges within the groove between the sheave flanges.

8. The method of claim 1, wherein
a second substrate is engaged with the applicator and includes a second adhesive backing;
the disposing further comprises disposing an end of the second substrate between the sheave and a second tension member at a first end of a circumferentially extending second sheave-member interface between the sheave and the second tension member; and
the applying further comprises applying the second substrate to the sheave by rotating the sheave about the axis thereof, and by attaching the second substrate to the sheave with the second adhesive backing as the second substrate moves through the second sheave-member interface during the rotation of the sheave.

* * * * *